United States Patent [19]

Woolf

[11] Patent Number: 4,648,271

[45] Date of Patent: Mar. 10, 1987

[54] ANEMOMETER HAVING A GRAPHITE FIBER HOT WIRE

[75] Inventor: Lawrence D. Woolf, Carlsbad, Calif.

[73] Assignee: GA Technologies Inc., San Diego, Calif.

[21] Appl. No.: 806,761

[22] Filed: Dec. 9, 1985

[51] Int. Cl.⁴ .............................................. G01F 1/68
[52] U.S. Cl. ........................................ 73/204; 338/28
[58] Field of Search ............... 73/204, 272 R; 338/25, 338/28; 219/553

[56] References Cited

U.S. PATENT DOCUMENTS

| | | | |
|---|---|---|---|
| 3,411,949 | 11/1968 | Hough | 117/223 |
| 3,432,330 | 3/1969 | Diefendorf | 117/46 |
| 3,484,183 | 12/1969 | Dickson et al. | 8/116 |
| 3,644,221 | 2/1972 | Wagner et al. | 252/503 |
| 4,102,960 | 7/1978 | Borkowski | 264/42 |
| 4,131,697 | 12/1978 | Randon et al. | 427/249 |
| 4,293,450 | 10/1981 | Vogel | 252/503 |
| 4,382,882 | 5/1983 | Vogel et al. | 252/503 |
| 4,424,145 | 1/1984 | Sara | 252/509 |
| 4,490,828 | 12/1984 | Fukuhara et al. | 219/553 X |
| 4,523,461 | 6/1985 | Watkins | 73/204 |
| 4,560,428 | 12/1985 | Sherrick et al. | 219/553 X |

OTHER PUBLICATIONS

L. D. Woolf et al., *Physical Review B* vol. 30, 861 (1984).
M. Endo et al., *Physical Review B* vol. 28 6982 (1983).
T. Koyama *Carbon* vol. 10 (1972) pp. 757–758.
"Selected Topics in Hot Wire Anemometer Theory" Flow Corporation, Arlington, Mass., Bulletin 25.

*Primary Examiner*—Herbert Goldstein
*Attorney, Agent, or Firm*—Fitch, Even, Tabin & Flannery

[57] ABSTRACT

A hot-wire anemometer includes a graphite fiber hot wire forming one arm of a resistance bridge. Graphite fibers have high tensile strengths, relatively high temperature coefficients of resistance and other thermal and electrical properties which make them particularly suitable for use as anemometer hot wires. The graphite fibers may be doped or intercalated with chemical species that adjust their thermal and electrical properties.

14 Claims, 2 Drawing Figures

ANEMOMETER HAVING A GRAPHITE FIBER HOT WIRE

The present invention relates to improved anemometers and more particularly to hot-wire anemometers having graphite fibers as hot wires.

BACKGROUND OF THE INVENTION

An anemometer is an instrument which measures the velocity of the flow of air or other gas and in some cases of liquids. While mechanical anemometers, such as cup anemometers are useful for measuring wind speed, hot-wire anemometers are required for more technical applications, such as measurements of turbulent velocity fluctuations.

The first major application of hot-wire anemometers was in the study of turbulence in air streams. It was known that the tendency of an air flow to lose its smooth laminar character and to break into small random turbulent eddies was of considerable importance in a number of aerodynamic problems (e.g., separation of boundary layers). The use of hot-wire probes permits not only oscilloscope portrayal of turbulent velocity fluctuations but also a numerical investigation of their magnitudes. Today, turbulence measurement with the hot-wire anemometer is a routine procedure, and with special X-wire or V-wire arrays, longitudinal and transverse components of turbulence can be measured separately, and the correlation between them (or between the same component at two different points in the flow) can be investigated.

Perhaps the most extensive application of anemometers at the present time is in the study of air flow in jet engine components. The fuel consumption of a jet engine depends very much on the efficiency of its compressor, which, in turn, depends on the detailed behavior of the air flow in its blading. Hot-wire anemometers are used to examine the air flow pattern around the blades, compressors and turbines.

Other current uses of hot-wire anemometers include but are not limited to: determination of blade misalignment tests on air-conditioning fans and pumps, where a glance at an oscilloscope shows whether or not all blades are properly aligned; measurement of average velocity, particularly where the velocity is fluctuating so that conventional pitot-static probes give unreliable readings, or where advantage can be taken of the small size and minimum flow interference of hot wires; high-temperature investigations in which probes can be built to withstand 800° C. for reasonable periods (higher, for short periods of time), e.g., in the study of combustion fluctuations; acoustic measurements where sound waves associated with velocity fluctuations are clearly reproduced by hot-wire anemometers; studies of vortices, e.g., ring vortices surrounding jets, or Karman vortex streets; studies of transition from laminar to turbulent flow, e.g., growth and shape of turbulent "spots"; shock tube measurements; measurement of instantaneous yaw angles (a hot wire responds only to that component of velocity perpendicular to the wire axis); studies of boundary layer behavior in "flutter" phenomena; and study of supersonic flow. Hot-wire instruments have been used successfully in gases other than air, and to some extent in liquids (particularly water).

Hot-wire anemometers are of two types, constant-voltage and constant-temperature (or constant resistance). In each type, the cooling of an electrically heated fine hot wire by a gas stream alters wire resistance as a function of the flow velocity. Briefly, with the constant-voltage type, as soon as the gas starts flowing, the hot wire cools off. The voltage across a Wheatstone bridge that includes the hot wire is kept constant, and a calibrated galvanometer shows a reading systematically related to the flow velocity. Briefly, with the constant-temperature (or constant-resistance) type, resistance of a voltage source across a Wheatstone bridge is increased to such a value that the wire which was cooled by the gas stream is again brought to its original temperature. The current in the hot wire, read by a calibrated ammeter, gives a measure of the flow velocity. Electric circuitry for these two types of hot-wire anemometers are well known in the art.

Fibers which are used as anemometer hot wires must be spanned out of contact with solid material. To be sufficiently sensitive, the fibers are very thin, giving them a large surface to mass ratio, and if such thin wires were supported throughout their length by a backing material, the backing material would act as a heat sink, reducing the sensitivity of the wire. Accordingly, the fibers are spanned between a pair of supports out of contact with heat-absorbing solid material. To keep the spanned fibers relatively straight, particularly in high velocity fluid streams, the fibers are mounted under considerable tension. Because of the thinness of the fibers useful as anemometer hot wires, and the tension under which they are placed, a high tensile strength is an important attribute for a fiber so used.

The heart of a hot-wire anemometer is the fiber or strand of material which comprises the hot wire. A hot-wire anemometer probe includes a hot wire stretched to be self-supporting between a pair of supports for exposure of the hot wire to the gas stream. The material of which the hot wire is formed must have a temperature coefficient of resistance throughout its operating temperature range which is unidirectional, i.e., either positive or negative, and sufficiently large so that the cooling effects of flowing gas may be readily detected by associated electronic circuitry. For fast temperature response, the hot wire is very thin, typically between about 2 and about 20 microns to provide a sensing area large relative to its mass. The hot wire is mounted under tension between the supports to avoid sagging, and in view of its thinness and the tension by which it is mounted, the material must have high tensile strength. Furthermore, the material must be stable throughout the operating temperature range of the hot wire, the temperature range typically being between about 130° C. and 800° C., and must be stable (nonreactive chemically) with the gases in the fluid stream to which it is exposed. Desirably, the heat capacity is low and the thermal conductivity is high, factors which contribute to rapid response.

Suitable materials for hot wires that have been heretofore used include certain metals and metal alloys, in particular tungsten and platinum alloys. While pure platinum has the requisite thermal properties, its tensile strength is too low for general use in anemometers, and, therefore, it is generally alloyed with other metals, for example, 90% (by weight) platinum-10% Rh fiber is frequently used for anemometer hot wires.

A major disadvantage of the tungsten and platinum alloys that are presently used as anemometer hot wires is their expense. The very thin fibers are formed by expensive drawing and etching procedures. Furthermore, these materials do not have tensile strengths as high as would be desired.

It would be desirable to have anemometer hot wires which are more easily and less expensively manufactured and which have higher tensile strengths relative to materials presently in use.

SUMMARY OF THE INVENTION

The invention provides a novel use of graphite fibers as hot wires in anemometers. Graphite fibers exhibit high tensile strengths, allowing very thin fibers with rapid temperature response to be used as hot wires. The graphite fibers are much more easily manufactured than are the metal fibers currently in use and generally have higher tensile strengths. The temperature coefficient of resistance and other thermal properties of these fibers are very favorable to their use in anemometers.

DETAILED DESCRIPTION OF THE PREFERRED EMBODIMENTS

In accordance with the present invention, thin graphite or modified graphite fibers are used as hot wires in hot-wire anemometers. The graphite fibers generally have higher tensile strengths than fibers presently used as hot wires. Importantly, graphite fibers are much more easily produced than are thin metal alloy fibers and are, therefore, much less expensive. The temperature coefficients of resistance of graphite fibers are consistent with their use as anemometer hot wires, and other thermal properties of graphite fibers are favorable to a rapid thermal time response. The fiber may be substantially pure graphite or may contain additional chemical species, such as boron, within the graphite structure, providing that such species do not greatly reduce the tensile strength of the fiber.

Figure 1:
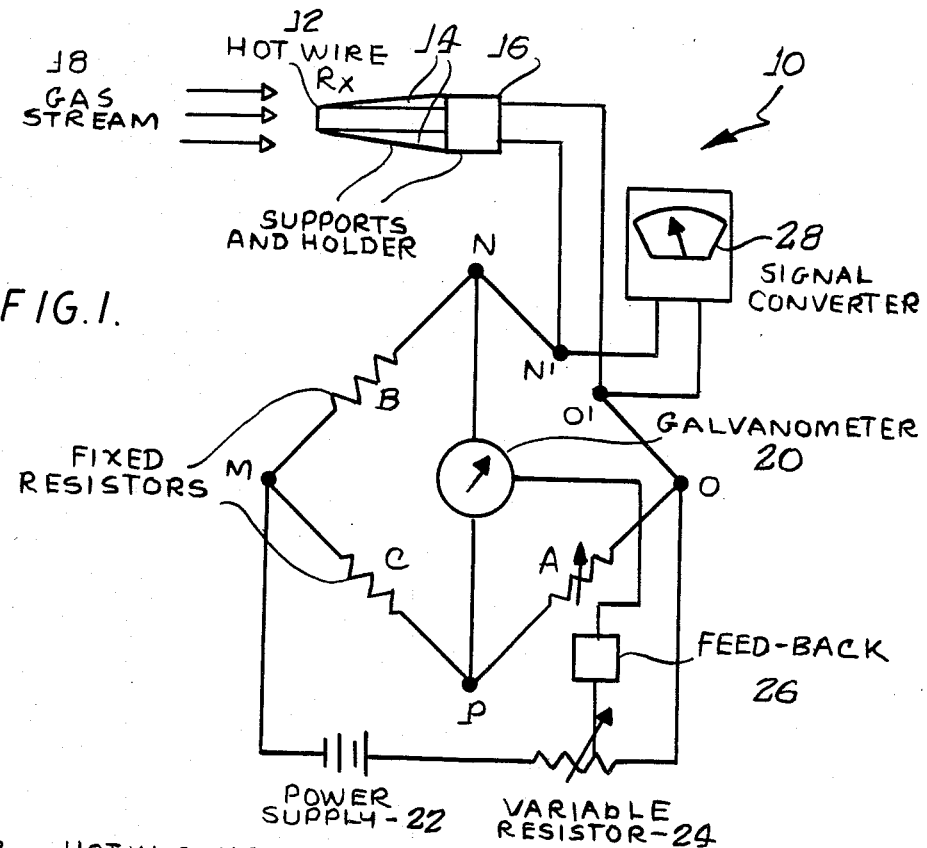
FIG. 1 is a diagrammatic illustration of a constant-resistance, (or constant-temperature) hot-wire anemometer in which a graphite hot wire according to the present invention is used.

Illustrated in FIG. 1 is an example of an anemometer circuit, indicated generally at 10, which includes, in accordance with the invention, a graphite hot wire 12 having a positive temperature coefficient of resistance. The exemplary anemometer circuit is of the constant-resistance type. The hot wire 12 is mounted as a span between a pair of supports 14 extending from a common holder 16 for exposure to a gas stream 18. The circuit is a Wheatstone bridge arrangement having terminals M, N, O and P wherein the hot wire 12 having a temperature dependent resistance ($R_X$) is connected in an unknown resistance arm, NO. Resistors A, B and C having respective resistances $R_A$, $R_B$ and $R_C$, are connected in arms PO, MN and MP, respectively. Resistor A may be a variable resistor for initial calibration; whereas, resistors B and C may be fixed resistors. Preferably, the resistances of resistors A, B and C are generally invariant with temperature, at least relative to the hot wire 12; for example, resistors A, B and C may each be of the constantan type.

The operating temperature of the hot wire 12 is determined by the power supplied thereto by a power supply 22 as adjusted by a variable resistor 24, the power supply and variable resistor 24 being connected in series between terminals M and O. The operating temperature of the hot wire 12 is set by adjustment of the resistor 24 to be considerably above the temperature of the flowing gas so that the hot wire measures the rate of external cooling effected by the flowing gas stream 18.

When the bridge is balanced, i.e., when $R_X/R_B = R_A/R_C$, there is no detectable current flow through the arm NP as detected by a galvanometer 20. In the absence of fluid flow, the bridge is balanced by initially adjusting tne resistance $R_A$ of variable resistor A, which is thereafter left untouched to function as a fixed resistor. A signal converter 28 systematically responsive to the current through the resistor $R_X$ then indicates the zero-velocity reading. When the gas stream cools tne hot wire 12, causing its resistance to change according to its temperature coefficient of resistance, the bridge is thereby unbalanced and the unbalance sensed. The galvanometer 20 is connected through a feed-back control 26 to the variable resistor 24 to effect a change in resistance $R_V$ of the variable resistor 24 in such direction as to reduce the unbalance. The change in $R_V$ readjusts the temperature of the hot wire 12 to its constant operating temperature at which the bridge is in balance because the resistance $R_X$ is thereby returned to its original value. During this process, any change in resistance $R_V$ brought about due to the cooling effect of the flowing gas has changed the voltage across points N'O', which voltage change is detected by the meter 28.

A correlation between current detected by the meter 28 and gas stream velocity is predetermined, e.g., empirically by a series of measurements in gas streams of different velocities. The meter-read current may be correlated to gas flow velocities by a comparison table, but preferably such a table or correlation is incorporated in computing circuitry associated with the meter 28 in order to give a direct readout of velocity.

The description of the apparatus with respect to FIG. 1 assumes that the gas stream is at a constant temperature, in which case the rate of cooling of the hot wire 12 is a function only of gas stream velocitv. Of course, if the temperature of the gas stream is changing, the rate of cooling will be a function both of gas stream temperature and gas stream velocity. The anemometer may include a gas stream temperature probe, and computing apparatus associated with the meter 28 may be programmed to take into account temperature changes of the gas stream, and thereby give an accurate gas velocity reading in the face of changing gas stream temperature.

Figure 2:
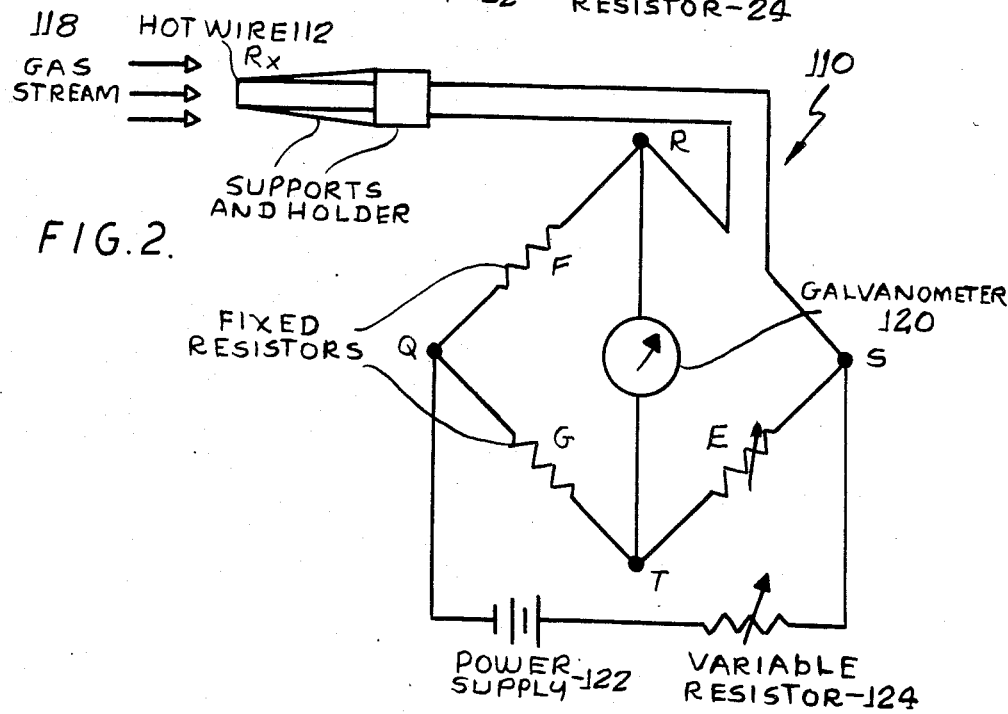
FIG. 2 is a diagrammatic illustration of a constant-voltage hot-wire anemometer in which a graphite hot wire according to the present invention is used.

Illustrated in FIG. 2 is a constant-voltage hot-wire anemometer which employs a graphite hot wire 112 according to the invention. In the bridge circuity 110 having terminals Q, R, S and T, a graphite hot wire 112 is placed in a gas stream 118. The hot wire 112 has a resistance $R_X$ in arm SR that varies according to its temperature, which is determined by the voltage supplied thereto by a power supply 122 as adjusted by a variable resistor 124 and by the velocity of the gas stream 118. Fixed constantan resistors F and G of respective resistances $R_F$ and $R_G$ are connected in arms RQ and QT, respectively, and a variable resistor E of resistance $R_E$ is connected in the arm ST. As in the bridge of FIG. 1, the bridge is balanced when $R_X/R_F = R_E/R_G$.

With no flow of gas, the resistance $R_V$ of a variable resistor 124 is adjusted until the hot wire 112 equilibrates at a suitable temperature, and the resistance $R_E$ is adjusted to balance the bridge, as indicated by no current through a calibrated galvanometer 120 connected between R and T. A gas stream velocity causes a proportional rate of external cooling of the hot wire, which is continuously internally heated by the power supplied thereto. The cooling of the hot wire and attendant change in hot wire resistance $R_X$ imbalances the bridge by an amount that is detected by the calibrated galvanometer. A correlation of gas flow velocity and galvanometer reading is worked out previously (e.g., empirically), and gas flow is read either by tables or by associated computer apparatus. Again, the circuitry assumes constant gas temperature, but changing gas stream temperature may be accommodated by appropriate calibration circuitry.

A major advantage of graphite fibers for use as anemometer hot wires is the very high tensile strengths which graphite fibers may exhibit. As mentioned above, an anemometer hot wire is mounted to be a self-supporting span and is placed under tension to prevent sagging, and in use, the hot wire is subject to hostile conditions of temperature and gas flow. The fiber should have sufficient tensile strength to withstand these conditions without breaking during extended periods of use. The tensile strength of the fiber depends on the inherent tensile strength of the material as well as the thickness or diameter of the fiber. The higher the inherent tensile strength of the material, the thinner may be the fiber that is used and still provide sufficient durability. The thinner the wire, the more rapid its response to temperature fluctuations, and thus the inherent tensile strength of certain graphite fibers permits the use of thinner hot wires and, consequently, more sensitive anemometers.

Graphite fibers may be manufactured having tensile strengths of up to about 50,000 Kg/cm$^2$ which compares favorably with tungsten which has tensile strengths in the 12,000 to 25,000 Kg/cm$^2$ range and 90% Pt-10% Rh which has tensile strengths in the 3300 to 7000 Kg/cm$^2$ range. Of course, the requisite inherent tensile strength of the graphite depends upon the anemometer application, and in those anemometer applications where rapid response is not required, graphite fibers having lower inherent tensile strengths and sufficient thicknesses to compensate may be used, particularly where such fibers are manufactured more cheaply than are the stronger fibers. Generally, the tensile strength of the graphite fiber should be at least about 3500 Kg/cm$^2$, preferably greater than 7000 Kg/cm$^2$ and more preferably greater than 20,000 Kg/cm$^2$.

Graphite fibers according to the invention may be as thick as 20 microns in diameter or higher for less sensitive applications. For more sensitive applications, graphite fibers may be manufactured and used as anemometer hot wires which are as thin as 2 microns in diameter, providing the inherent tensile strength of the graphite is sufficiently high.

A preferred fiber for use as an anemometer hot wire is a graphite that is pyrolytically and catalytically derived from a vaporized hydrocarbon. An example of such a fiber is "benzene-derived graphite", such as is produced by the method taught by T. Koyama, *Carbon* 10 757 (1972). By the Koyama method, an iron particle, which is typically about 100 angstroms in diameter, is placed on a graphite substrate and subjected to a flow of benzene heated to about 1200° C. The pyrolytically decomposing benzene grows a carbon fiber with the seed particle at the growing end. By this method, fibers between about 2 and about 20 microns in diameter may be grown. Subsequent to formation, the carbon fibers are heat-treated to graphitize the same and thereby increase their tensile strength. For example, carbon fibers are heated to about 3000° C. in an inert atmosphere. Graphite fibers formed in this manner have large crystallite sizes of about one micron. Electrical properties of these fibers are discussed in Woolf, L. D. et al., *Physical Review B*, Vol. 30, 861 (1984). Fibers may be grown in a similar manner from other hydrocarbons such as methane or acetylene.

Graphite fibers that have large crystal sizes, i.e., are highly anisotropic, in addition to exhibiting high tensile strength, have relatively high positive temperature coefficients of resistance that are relatively constant from about room temperature on upward throughout the temperature range in which anemometer hot wires are typically heated, e.g., up to about 800° C. It is, of course, requisite that a hot wire have a temperature coefficient of resistance that is sufficiently large that slight changes in temperature affect the resistance of the hot wire and thereby unbalance the bridge circuitry in which it is incorporated. The temperature coefficient of resistance may be either positive or negative within the operating temperature range of the hot wire but should not peak or plateau within the range. Anisotropic graphite fibers having positive temperature coefficients of resistance are preferred because, when positive, the coefficient remains relatively constant throughout the operating temperature range of most hot wires. The negative temperature coefficients of resistance exhibited by more isotropic graphite fibers tend to decrease (in absolute value) at higher temperatures. How critical the changes in temperature coefficient of resistance with temperatures are depends upon the type of circuitry in which the hot wire is incorporated and is least important in constant-temperature anemometers, where the hot wire is maintained at a relatively constant temperature. For good sensitivity, it is preferred that the temperature coefficient of electrical resistance have an absolute value greater than about 0.001° C.$^{-1}$. In graphite fibers, a room temperature (20° C.) resistivity which is low is generally indicative of a uniform positive temperature coefficient of resistivity. For purposes of this invention, it is preferred that the resistivity of the graphite fiber at 20° C. be from about 50 to about 100 microhm-cm.

Graphite fibers formed by other methods are also suitable, provided that the graphite fiber has the requisite tensile strength for the particular application and has electrical and thermal characteristics conducive to anemometer measurements. In U.S. Pat. No. 3,411,949 a method of pyrolytically producing graphite fibers from hydrocarbons is described in which fiber formation is initiated with an electric arc discharge. Fibers may be formed by pyrolysis of organic fibers, such as rayon or acrylonitrile polymers and copolymers. Fibers may also be derived from pitch, such as mesophase pitch.

The graphite fibers used as anemometer hot wires may be doped with from about 0.001 to about 1 percent by weight boron. In boron-doped graphite, the boron atoms replace carbon atoms within the graphite structure. An important advantage of boron doping is that boron-doped graphite fibers do not need to be heat-treated to as high a temperature as do undoped fibers to achieve comparable tensile strengths. Boron may be doped into a benzene-derived graphite fiber during its formation by inclusion of boron or a boron-containing compound, e.g., diborane, in the benzene atmosphere.

Alternatively, boron may be doped into a graphite fiber that is already formed by heating the graphite fiber in the presence of boron. Boron doping is known to alter the electrical resistivity of graphite, as described, for example, in U.S. Pat. No. 3,644,221. These changes may enhance the suitability of the graphite fiber for use as an anemometer hot wire, particularly if the absolute value of the temperature coefficient of resistance is increased or if the coefficient is more linear over the operating temperature range.

In certain cases, the graphite fiber may contain intercalated species, such as $FeCl_3$ and $CoCl_2$. The intercalated species tend to increase the temperature coefficient of resistance. For example, whereas the coefficient of benzene derived graphite is about $0.0011° C.^{-1}$, $FeCl_3$-intercalated graphite has a coefficient of $0.0040° C.^{-1}$, and $CoCl_2$-intercalated graphite has a coefficient of $0.0033° C.^{-1}$, values that are comparable to that of tungsten and which exceed that of 90% Pt-10% Rh. The intercalated species reduce the tensile strength of the graphite fiber, typically by about a factor of two. However benzene-derived graphite intercalated with $FeCl_3$ or $CoCl_2$ have inherent tensile strengths comparable to tungsten fibers and exceeding that of platinum alloy fibers. Other useful intercalated species include but are not limited to $SbCl_5$ and $Br_2$.

Graphite fibers are intercalated by heating the fibers in the presence of the intercalating species at relatively low temperatures, e.g., about 400° C. Intercalation of graphite is described, for example, in M. Endo et al., *Physical Review B,* Vol. 28, p. 6982, 1983. Generally stage 1 through stage 5 intercalated fibers have greatest applicability to use as anemometer hot wires.

A major limitation to the use of intercalated fibers as anemometer hot wires is that most intercalated graphite fibers are not air-stable. $FeCl_3$ and $CoCl_2$ intercalated graphite fibers are air stable, but only to about 250° C. to 350° C., and thus are suitable only for use in relatively low temperature applications.

Graphite fibers and modified graphite fibers have the additional advantages of having relatively low heat capacities and high thermal conductivities. For example, at about 20° C., the thermal conductivity of benzene-derived graphite is a factor of about three higher than that of copper. These attributes contribute to a rapid thermal time response of the fiber. A consequence of the low heat capacity is that only a small addition or withdrawal of heat will raise or lower the temperature of the wire. The high thermal conductivity helps to dissipate excess heat of the wire, e.g., to the supports by which it is mounted. Although the heat capacities and thermal conductivities of most graphite and modified graphite fibers are consistent with use as an anemometer hot wire, for those applications where the most rapid response to temperature fluctuation is required, it is preferred that the heat capacity be below about 2.5 cal/mole-K at 20° C. and that the thermal conductivity be above about 500 W/m-K at 20° C.

Because graphite is subject to oxidation and because anemometer hot wires may be subjected to elevated temperatures so that even atmospheres that are relatively non-oxidizing may have a long-term deleterious effect on a graphite fiber hot wire, it is desirable to coat the hot wire with a non-oxidizable material that does not substantially alter the thermal or electrical characteristics of the fiber. A preferred coating material is silicon carbide, which may be deposited on the graphite fiber, e.g., as taught by the above-identified U.S. Pat. Nos. 3,411,949 or 4,131,697. A silicon carbide coating on a carbon fiber may generally be between about 0.1 and about 5 microns thick.

The length of the fiber that is placed in the gas stream is generally very short, typically having a length of 1 mm or less. The fiber is mounted under tension spanned between a pair of supports which ideally should not significantly affect the temperature of the hot wire itself. The adhering material which is in direct contact with the fiber should have a low electrical resistance relative to the fiber itself and a large surface area, in which case the material remains generally at the temperature of the flowing gas even though the fiber supported thereby is heated to well above the temperature of the flowing gas. Suitable support material for mounting graphite fibers to a support includes epoxy that contains a powdered conductive material, such as powdered silver or powdered graphite.

It can now be more fully appreciated that graphite fibers have several advantages for use as anemometer hot wires. A major advantage over very fine metal wires is the reduced expense, as graphite fibers may be produced pyrolytically without expensive drawing and etching procedures. In fact, suitable graphite fibers are commercially available at fractions of the cost of metal anemometer hot wires. Another major advantage of graphite fibers is their high tensile strength, which makes it possible to use thinner, more responsive fibers as hot wires in anemometer probes. Other electrical and thermal characteristics of graphite fibers, such as suitable electrical resistivity, low heat capacity and high thermal conductivity also contribute to the desirability of graphite fibers as anemometers hot wires.

While the invention has been described with reference to certain preferred embodiments, modifications obvious to one with ordinary skill in the art may be made without departing from the scope of the invention.

Various features of the invention are set forth in the following claims.

What is claimed:

1. A hot-wire anemometer comprising electrical resistance bridge means including a fiber hot wire resistor in one arm thereof that has a temperature-dependent resistance, said fiber hot wire being formed substantially of graphite, means for supplying electrical power to said fiber hot wire to internally heat the same, means for supporting a span of said hot wire in tension for exposure to a stream of flowing cooling gas, and signal converting means coupled to said bridge means for correlating the cooling effect on the hot wire resistance with gas flow velocity.

2. An anemometer according to claim 1 wherein said fiber has a temperature coefficient of resistance, in the temperature range throughout which it is to be used, having an absolute value of at least about $0.001° C.^{-1}$.

3. An anemometer according to claim 1 wherein said fiber has a diameter of between about 2 and about 20 microns.

4. An anemometer according to claim 1 wherein said fiber has a coating of material resistant to oxidation.

5. An anemometer according to claim 4 wherein said coating is silicon carbide.

6. An anemometer according to claim 5 wherein said silicon carbide coating is between about 0.1 and about 5 microns thick.

7. An anemometer according to claim 1 wherein said fiber is doped with between about 0.001% and about 1% by weight boron.

8. An anemometer according to claim 1 wherein said fiber includes an intercalated species.

9. An anemometer according to claim 8 wherein said intercalated species is selected from the group consisting of $FeCl_3$, $CoCl_2$, $SbCl_5$ and $Br_2$.

10. An anemometer according to claim 1 wherein said fiber is a fiber which has been formed by pyrolytic decomposition of a hydrocarbon.

11. An anemometer according to claim 10 wherein said fiber is a fiber which has been formed by pyrolytic decomposition of benzene.

12. An anemometer according to claim 10 wherein said fiber is a fiber which has been formed by pyrolytic decomposition of methane or acetylene.

13. The anemometer according to claim 1 wherein said fiber is which is substantially anisotropic.

14. An anemometer according to claim 1 wherein said fiber has a resistivity at 20° C. of between about 50 and about 100 microhm-cm.

* * * * *